United States Patent
Leupolz et al.

(10) Patent No.: US 7,195,202 B2
(45) Date of Patent: Mar. 27, 2007

(54) METHOD AND DEVICE FOR IMPROVING THE THERMAL COMFORT IN PASSENGER AIRPLANES

(75) Inventors: Andreas Leupolz, Horgenzell (DE); Werner Scherber, Bermatingen (DE)

(73) Assignee: Airbus Deutschland GmbH, Hamburg (DE)

( * ) Notice: Subject to any disclaimer, the term of this patent is extended or adjusted under 35 U.S.C. 154(b) by 881 days.

(21) Appl. No.: 09/874,371

(22) Filed: Jun. 6, 2001

(65) Prior Publication Data

US 2002/0017592 A1 Feb. 14, 2002

(30) Foreign Application Priority Data

Jun. 6, 2000 (DE) ................................. 100 27 925

(51) Int. Cl.
    *B64D 11/00* (2006.01)
(52) U.S. Cl. .................................... 244/118.5; 244/121
(58) Field of Classification Search ............ 244/118.5, 244/121, 129.3, 158 A; 428/34, 38; 427/162, 427/163.1, 164
    See application file for complete search history.

(56) References Cited

U.S. PATENT DOCUMENTS

| 3,920,533 | A |   | 11/1975 | Pompei |
|---|---|---|---|---|
| 4,692,809 | A | * | 9/1987 | Beining |
| 4,731,289 | A | * | 3/1988 | Coleman ..................... 428/334 |
| 5,387,433 | A |   | 2/1995 | Balian et al. |
| 5,718,980 | A |   | 2/1998 | Koch et al. |
| 5,783,049 | A | * | 7/1998 | Bright et al. .......... 204/192.14 |
| 5,976,702 | A | * | 11/1999 | Yoneda et al. ............. 428/429 |
| 6,055,088 | A | * | 4/2000 | Fix et al. .................... 359/265 |
| 6,063,479 | A | * | 5/2000 | Yoshikawa et al. ......... 428/192 |
| 6,092,915 | A | * | 7/2000 | Rensch ........................ 362/30 |
| 6,178,034 | B1 | * | 1/2001 | Allemand et al. .......... 359/265 |
| 6,210,791 | B1 | * | 4/2001 | Skoog et al. ............... 428/325 |
| 6,249,369 | B1 | * | 6/2001 | Theiste et al. ............. 359/265 |
| 6,262,364 | B1 | * | 7/2001 | Yoshikawa et al. .... 174/35 GC |
| 6,362,303 | B1 | * | 3/2002 | Byker et al. ............... 116/216 |
| 6,391,400 | B1 | * | 5/2002 | Russell et al. ................ 428/34 |
| 6,468,647 | B1 | * | 10/2002 | Sutter et al. ................ 428/325 |
| 2003/0054127 | A1 | * | 3/2003 | Heifetz ...................... 428/40.1 |

FOREIGN PATENT DOCUMENTS

DE 69210860 T2 11/1996
GB 2080339 7/1981

* cited by examiner

*Primary Examiner*—Timothy D. Collins
(74) *Attorney, Agent, or Firm*—Crowell & Moring LLP

(57) ABSTRACT

The invention relates to a method for improving the thermal comfort in passenger planes by means of a heat-reflecting coating with a low thermal emission coefficient, and airplanes and airplane parts bearing this coating. According to the invention, the coating is applied to the existing interior surfaces of the airplane cabin wall such that a passenger of the airplane may be in direct radiation exchange with this coating.

14 Claims, 1 Drawing Sheet

METHOD AND DEVICE FOR IMPROVING THE THERMAL COMFORT IN PASSENGER AIRPLANES

BACKGROUND OF THE INVENTION

This application claims the priority of German application 10027925.2-22, filed Jun. 6, 2000, the disclosure of which is expressly incorporated by reference herein.

The invention relates to a method for improving thermal comfort in passenger airplanes. The invention further relates to improved airplanes and improved interior cabin parts for airplanes.

From the field of climatization measuring technology, it is known that thermal comfort (and associated satisfaction with the climatic environment) requires that a person's condition be thermally balanced in that person's thermal environment. The heat produced by the person must be equal to the heat eliminated to the environment. Deviations result in physiological reactions which, within individual tolerance ranges, are increasingly found to be uncomfortable. Thermal discomfort due to too much heat is associated with, for example, perspiration, whereas thermal discomfort due to coldness leads to a rise of the metabolism and increased muscle activity such as, for example, shivering.

Beside the person's activity and the thermal insulation of the person's clothing, the two variables which most influence the person's thermal comfort are related to the person's direct thermal environment, namely:

(1) the velocity, temperature and moisture of the ambient air; and
(2) the temperature of the enclosing surfaces with which the person is exchanging radiation.

The interaction of the air temperature and the radiation temperature of the enclosing surfaces surrounding the person influences the person's thermal feeling to a high degree. Thus, to a certain extent, at low air temperatures, an increased radiation temperature can contribute to a high thermal comfort of the air conditions in an indoor space. On the other hand, low radiation temperatures have to be compensated by a raising of the air temperature. Indoor space climatization measuring technology indicates that these relationships have to be taken into account when rating a thermal environment.

In the case of passenger planes, at travelling altitude, these enclosing surfaces have low surface temperatures because of the low outside temperature, typically of less than −50° C., and the limited possibility of insulation. With the normally used material of the enclosing surfaces, this results in low radiation temperatures. For passengers situated in seats in the direct proximity of these cold surfaces, a radiation cooling will occur which feels uncomfortable, particularly during long-distance flights.

In addition to the different climatic conditions depending on the distance of the seat from the enclosing surfaces, the climatic situation at the seat differs considerably. The large temperature differences of the radiation temperatures lead to an asymmetrical climatic environment for the left or right body half respectively which is felt to be particularly uncomfortable ("cold-shoulder effect"). Compensation of this unfavorable radiation climate by raising local air temperature is difficult to implement by means of climatization techniques.

In the case of the interior coating in heat protection glazes, coatings are used which have low-emission characteristics for improving the insulation effect. By inhibiting the radiation exchange between the inside and the outside pane, the thermal conduction coefficient of the overall arrangement is reduced, which results in a rise of the actual temperature of the inside pane.

Processes for producing heat protection glazes, particularly thermal insulating glazes, as well as their application in the field of construction engineering and in vehicles are described, for example, in German Patent Documents DE 692 10 860 T2 and DE 694 04 690 T2. Other known processes, particularly for improving the resistance to corrosion of the coatings in heat protection glazes, are known from German Patent Documents 30 27 256 C2 and DE 2 417 927.

It is an object of the invention to improve the unfavorable climatic situation described above and thus improve the thermal comfort of passengers in passenger airplanes.

This goal is achieved by the invention described below. In particular, this goal is achieved by the disclosed method of improving thermal comfort in a passenger airplane in which a heat-reflecting coating with a low thermal emission coefficient is applied to interior surfaces of a cabin of a passenger airplane, and whereby a passenger located in the airplane cabin in which the coating has been applied has a direct radiation exchange with coated surfaces. Moreover, an airplane containing interior cabin surfaces coated as described achieves this goal.

According to the invention, the coating preferably is applied to the existing interior surfaces of the airplane cabin wall and a passenger is in a direct radiation exchange with this coating.

The heat radiation or radiant energy Q(T) of a body having a surface temperature $T_O$ is essentially a combination of the characteristic radiation of the body ($1^{st}$ summand) and the reflected environmental radiation of a temperature $T_U$ ($2^{nd}$ summand) according to the following equation:

$$Q(T) \approx \epsilon \cdot T_O^4 + (1-\epsilon) \cdot T_u^4 \qquad (1)$$

wherein $\epsilon$ is the thermal emission coefficient of the surface of the body. In each case, the temperatures are in the absolute temperature scale.

The thermal emission coefficient (i.e., emissivity) $\epsilon$ is characteristic of a material's surface and indicates the intensity with which a body absorbs and emits heat radiation. In the case of the so-called "full radiator" (i.e., a perfect blackbody), the thermal emission coefficient is maximal and amounts to 1. Most material surfaces, for example, decorative surfaces, are "non-selective radiators" (i.e., a grey body) with an emission value close to 1.

Equation (1) demonstrates that a lowering of the thermal emission coefficient causes a reduction of the thermal radiation of the surface of the body in favor of an increased reflection of the environmental radiation. As the thermal emission coefficient of a surface is increasingly reduced, the heat radiation Q(T) is determined less and less by the surface temperature $T_O$ of the body and more and more by the temperatures $T_U$ of the environmental radiation reflected by the environmental surfaces.

The thermal emission coefficient is a function of the temperature and of the wavelength. At normal room temperatures, the radiation maximum is at a wavelength of approximately 10 μm. For improving the thermal comfort in passenger planes, the thermal emission coefficient at approximately 10 μm is therefore important.

As a result of the coating according to the invention which has a low thermal emission coefficient, in contrast to the interior coating of heat protection glazes, rather than the actual surface temperature the radiation temperature of the coated airplane cabin wall is raised. This increase of the radiation temperature (herein the "enclosing-surface temperature") results from a reflection of the surface temperatures of objects from the cabin interior (for example, passengers, seats, hat racks, etc.). Since the surface temperatures of these objects typically are at least the ambient air temperature, a clear rise of the enclosing-surface temperature is achieved and the radiation cooling of the passengers is reduced.

This results in the advantage that a radiation climate comfortable for the passenger is achieved in a purely passive manner without the requirement of climatization energy, saving additional costs.

A physiological effect occurs for the passenger based on the fact that the passenger himself regulates the radiation exchange between himself and the enclosing surfaces.

Another advantage is that the invention works with materials presently used in airplane interiors. It is only necessary to apply the low-emission coating of the invention to these materials.

In an advantageous further development of the invention, the coating with the low thermal emission coefficient can be transparently conductive. Thus, the coating can be applied to transparent material of the airplane cabin wall, such as a windows, or can be applied inconspicuously to lateral covering parts of the airplane cabin wall.

In a preferred embodiment of the invention, the coating is a conductive metal oxide, such an indium tin oxide.

The thickness of the metal oxide layer is advantageously less than 1 µm, particularly between 200 nm and 500 nm. The conducting capacity and thus the thermal emission coefficient of the layer can be varied based on the thickness of the metal oxide layer.

In an advantageous embodiment, the thermal emission coefficient is probably lower than 0.5. It is more probably in the range of between 0.1 and 0.3. As a result, at least 50% of the heat radiation is reflected from the interior of the airplane cabin on the airplane cabin wall.

Preferably, the coating is applied to the lateral covering parts and the windows in the airplane cabin which contribute to the radiation cooling because of the very low temperatures.

In another preferred embodiment, a coating of the invention having a low thermal emission coefficient can be applied to the windows which are normally made of a transparent plastic material, such as polymethylmethacrylate (PMMA) or polycarbonate. It is also possible to apply a foil made of a transparent plastic material to the windows, which material is coated with the coating of the invention.

For the lateral covering parts, in another preferred embodiment of the invention, the coating with the low thermal emission coefficient can be applied to decorative plastic foils normally used in airplanes, such as polyvinylfluoride (PVF) or polyvinylidenefluoride (PVDF).

With the low-emission coating, the radiation exchange between a passenger and the enclosing surfaces may be regulated, whether the enclosing surfaces are hot or cold. This ensures a neutral heat balance, and neither an excessive heat absorption nor heat emission to the environment occurs.

Other objects, advantages and novel features of the present invention will become apparent from the following detailed description of the invention when considered in conjunction with the accompanying drawings.

BRIEF DESCRIPTION OF THE DRAWINGS

The invention is described below in detail with the assistance of the following drawings.

DETAILED DESCRIPTION OF THE DRAWINGS

Figure 1:
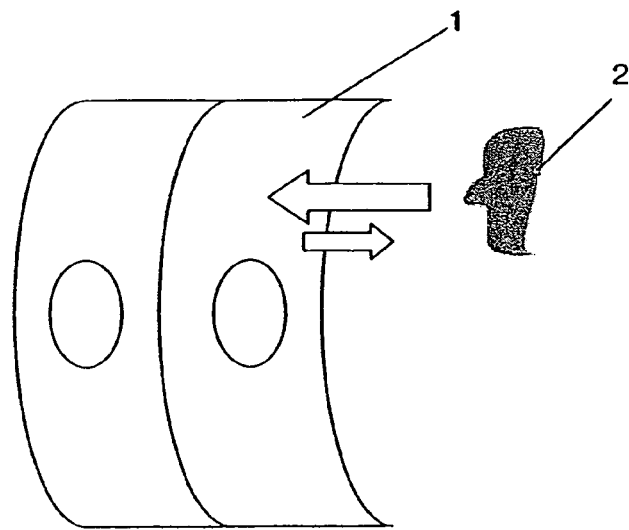
FIG. 1 depicts the radiation relationship between a passenger and the interior surface of an airplane cabin without the coating of the invention.

The radiation relationship between the interior surface 1 of the airplane and the passenger 2 without a coating having low-emission characteristics is depicted in FIG. 1. The passenger 2 radiates heat according to his body temperature. The interior surface 1 radiates heat according to its surface temperature. Since the interior surfaces 1 in passenger planes have low surface temperatures because of the low outside temperatures, this results in low radiation temperatures. A radiation cooling of the passengers will therefore occur.

Figure 2:
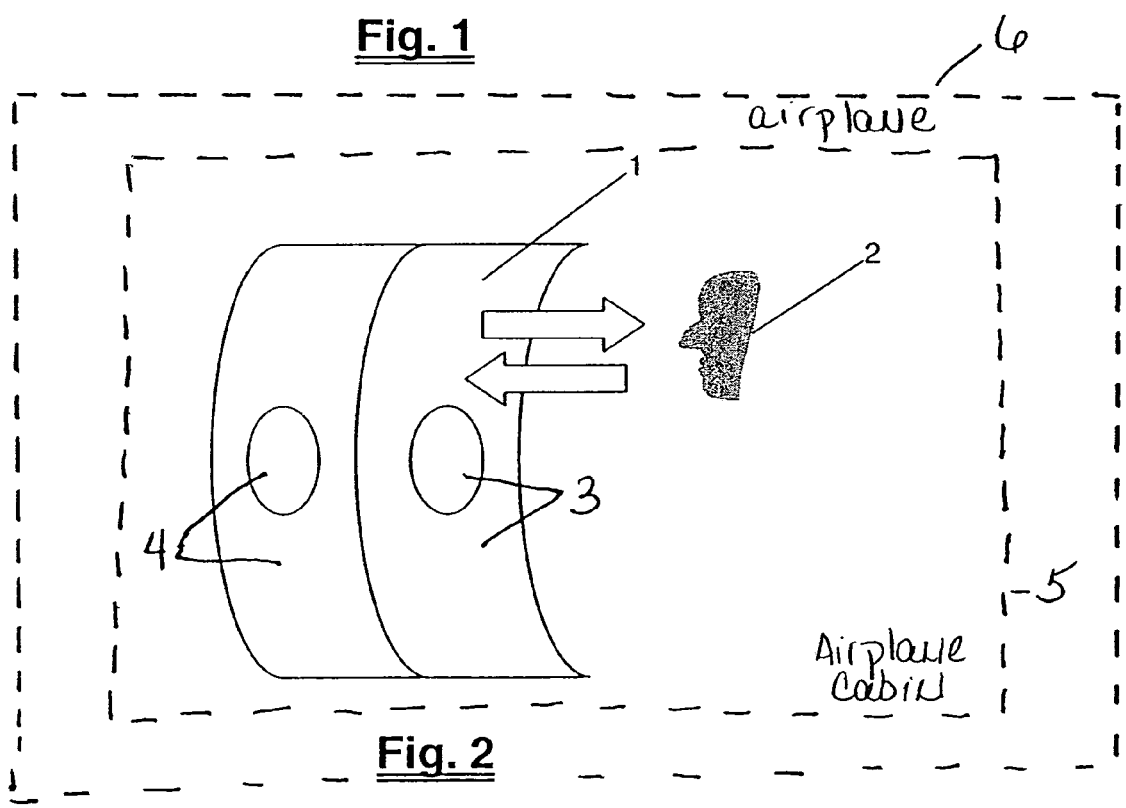
FIG. 2 depicts the radiation relationships between a passenger and the interior surface of an airplane cabin including the coating of the invention.

The radiation relationship between the interior surface 1 of the airplane and the passenger 2 with a coating according to the invention which has a low thermal emission coefficient is illustrated in FIG. 2. The passenger 2 radiates heat according to his body temperature. The heat radiation of the interior surface 1, as a result of the coating of the invention, is determined not by the actual surface temperature of the interior surface 1 but by the passenger's 2 body temperature. Thus, a radiation cooling of the passenger 2 is prevented.

The coating 3 of the invention may be applied to the interior surface 1 of a part 4 (e.g. an interior wall panel, a window) of the cabin 5 (shown in block form) of airplane 6 (shown in block form).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of improving thermal comfort in a passenger airplane, the airplane having a cabin with interior surfaces, the airplane cabin for transporting one or more passengers, the method comprising:

applying a heat-reflecting coating with a thermal emission coefficient no greater than approximately 0.5 to at least one interior surface of a cabin of a passenger airplane, whereby the coating provides improved radiation exchange with a passenger in the airplane cabin when compared with an uncoated interior surface wherein the at least one interior surface of the airplane cabin comprises decorative plastic foil, and wherein the coating is applied to the decorative plastic foil.

2. The method of claim 1, wherein the decorative plastic foil comprises polyvinylfluoride.

3. The method of claim 1, wherein the decorative plastic foil comprises polyvinylidenefluoride.

4. The method of claim 1, wherein the coating is a transparent conductive coating.

5. The method of claim 1, wherein the coating comprises a conductive metal oxide.

6. The method of claim 1, wherein the coating comprising indium tin oxide.

7. The method of claim 1, further comprising selecting a coating thickness to achieve a desired thermal emission coefficient for the coating.

8. The method according to claim 7, wherein the thickness of the coating, as applied, is less than 1 μm.

9. The method of claim 1, wherein at least one interior surface of the airplane cabin further comprises at least one window of transparent plastic material, and wherein the coating is applied to the at least one window.

10. The method of claim 9, wherein the at least one window comprises polymethylmethacrylate.

11. The method of claim 9, wherein the at least one window comprises polycarbonate.

12. The method of claim 1, wherein the at least one interior surface of the airplane cabin comprises decorative plastic foil, and wherein the coating is applied to the decorative plastic foil.

13. The method of claim 1, wherein the decorative plastic foil comprises polyvinylfluoride.

14. The method of claim 1, wherein the decorative plastic foil comprises polyvinylidenefluoride.

* * * * *